Dec. 16, 1952

H. B. VAN DORN 2,621,511

PNEUMATIC GAUGING DEVICE

Filed Dec. 20, 1947

Inventor
HORACE B. VAN DORN

Mitchell Bechert
Attorneys

Patented Dec. 16, 1952

2,621,511

UNITED STATES PATENT OFFICE 2,621,511

PNEUMATIC GAUGING DEVICE

Horace Bishop Van Dorn, New Britain, Conn., assignor to The Fafnir Bearing Company, New Britain, Conn., a corporation of Connecticut Application December 20, 1947, Serial No. 793,022

7 Claims. (Cl. 73—37.5)

My invention relates to measuring devices which employ pressurized fluids for effecting measurements.

It is an object of my invention to provide an improved device of the character indicated.

It is a specific object to provide an improved device for calibrating sections of tapered rollers, rods, or other pieces.

It is in general an object to provide an improved pressure-fluid operated calibrating device adaptable for use in the production-line precision calibration of antifriction elements of the barrel, tapered cylindrical, spherical or the like types.

Figure 1:
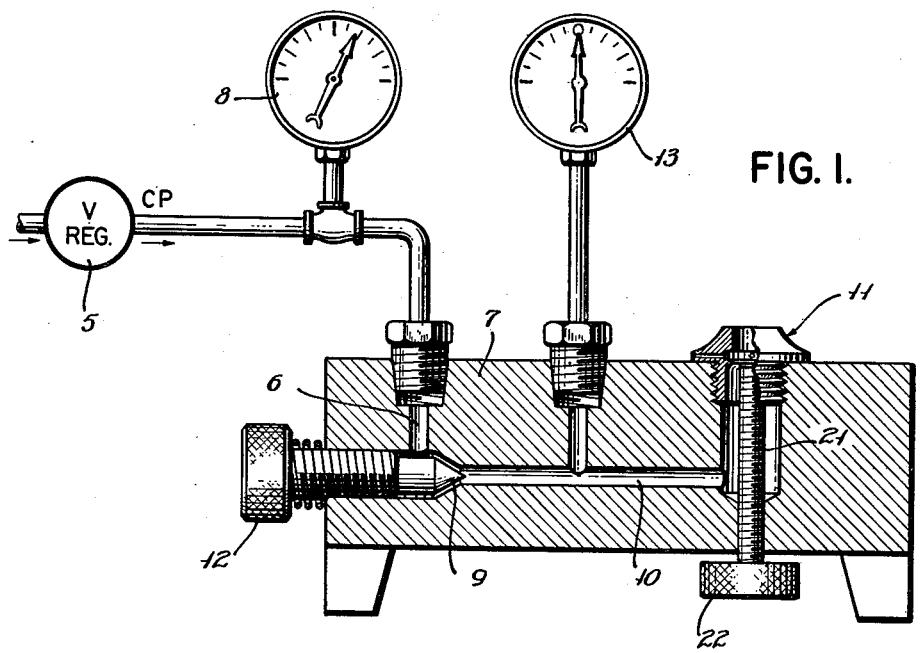
Figure 2:
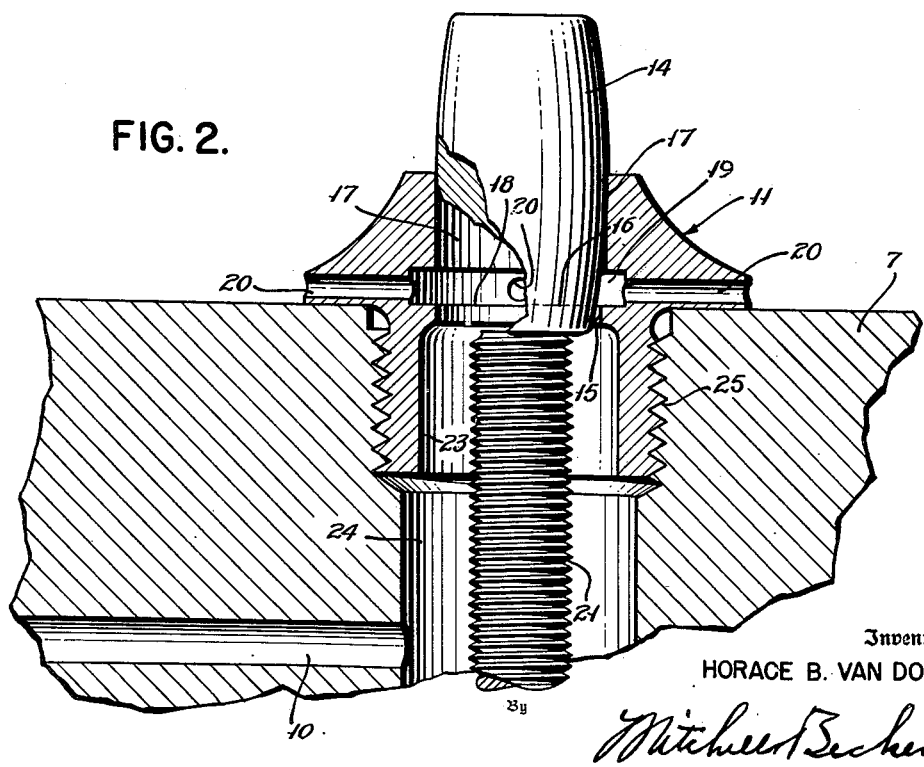

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a more or less schematic sectional view of a complete gage instrument incorporating features of the invention; and Fig. 2 is an enlarged fragmentary sectional view of parts of the arrangement of Fig. 1.

Briefly stated, my invention contemplates a gage that will support a roller or the like for calibration at one section thereof; calibration is performed by forming an annular orifice at said section, so that when pressure fluid is supplied to such orifice, the pressure in the supply line to the orifice may be an indication of the size of the orifice and, therefore, of the size of the section to be gaged. In the form to be described, the gage element is insertably removable from a supporting block which also includes axially adjustable positioning means, whereby a desired particular roller cross-section to be tested may be appropriately positioned opposite the orifice; the described form also includes radial-alignment means for substantial axial alignment of the roller in the gage.

Referring to the drawings, my invention is shown in application to an air-pressure gage system employing a regulator valve 5 to supply air under essentially constant pressure (i. e. substantially independent of supply-line pressure fluctuations) to the inlet passage 6 in a gage block 7. The regulated inlet pressure may be observed on any desired pressure-responsive indicator, such as a flow tube or the Bourdon gage 8 shown. In the block 7, pressurized air is conducted past an orifice 9 to a passage 10 for supplying a gage element or gage-orifice member 11, and in the form shown, the orifice 9 is adjustable by means of the needle-valve element 12. Pressure downstream from the orifice 9 may be observed on a second Bourdon or other pressure indicator 13.

The gaging element or gage-orifice member 11 is preferably separate from the gage block 7 so that the described system may be adaptable to the calibration of a number of different sized rollers or the like, such as the barrel roller 14, which may be an element of an antifriction bearing. The gaging element in a preferred form consists essentially of a gage bore 15 having a diameter in excess of the diameter of roller 14 at the cross-section 16 to be calibrated. The gage element 11 also preferably carries or integrally includes radial-positioning means 17 for supporting the roller 14 to be tested and for radially locating, and thus axially aligning the same generally coaxially with the gage bore 15, and, in the form shown, the supporting means 17 is a counterbore of diameter substantially equal to the maximum diameter of the roller 14. To permit such a free flow of pressure fluid through the gage element 11 that the annular clearance between the rim 18 of bore 15 at the test section provides substantially the only controlling constriction, I provide an exhaust manifolding recess 19 immediately adjacent the rim 18, and a plurality of exhaust openings 20 permit relatively free passage of exhaust air to the atmosphere at the downstream side of the annular orifice 16—18.

In order properly to position a roller 14 inserted into the gage element 11, I provide an adjustable limiting abutment, which is shown as a screw 21 threaded to the base member 7 and projecting preferably coaxially with the bore 15 into proximity with the gaging section. It will be clear that upon turning the knob 22 for screw 21, there may be corresponding adjustment of the inserted end of the roller 14 to be tested so that the orifice rim 18 may be appropriately positioned with respect to the section to be calibrated.

In order to maintain a relatively unconstricted flow of pressurized air from passage 10 to the gaging orifice, the gage element 11 may be provided with an enlarged inlet opening, such as the counterbore 23, and the base member 7 may include a large bore 24 to receive the gage element 11. In the form shown, the gage element 11 is threaded, as at 25, to the gage block for ready removability and replacement, depending on the size of roller 14 to be tested.

In use, it will be appreciated that my measuring device may be rapidly set up by appropriate selection of a gage element 11 for the size of roller 14 to be calibrated. The knob 22 would then be adjusted to position the roller 14 with respect to the orifice rim 18 so that the desired cross-section 16 may be observed. In the barrel roller shown, for example, it may be desirable to check section diameter at the so-called 10% point, that is, at a point 10% of the axial length of the roller in from one end thereof; the knob 22 would in such case be appropriately adjusted. The regulator valve 5 should be set to provide a specified reading on the indicator 8, and, if desired, the needle of gage 13 may be positioned, as by an adjustment of the needle valve 12 to produce a zero reading on indicator 13 when a standard roller 14 is inserted in the gage element 11. Upon insertion of the roller 14, as by manually pressing the top end of the roller 14 firmly against the abutment screw 21, the pressure in passage 10 will rise in accordance with the constricting effect of the orifice 18—16. If the scale on indicator 13 is appropriately inscribed and if the needle thereof has been set to zero (by adjustment of needle valve 12, as described above), then it will be clear that the indicator 13 may be direct reading of the clearance at orifice 16—18, or of departure from some specified tolerance, or of the actual cross-sectional diameter at section 16.

In practice, the above-described instrument has been found readily adapted to production-line procedures, by having a single operator use one hand to hold a first roller 14 in the gaging position while he is making a reading on the indicator 13; with the other hand, he may be grasping for another roller 14 to be calibrated. As soon as he has satisfied himself as to the reading on the first roller 14, he merely removes his hand, and the air pressure acting over the inserted end of the first roller 14 is sufficient to eject the roller into a tray which has been labeled, say, "within tolerances." If the gaging operation shows the roller 14 to be above or below the specified size, the operator may use the same hand graspingly to remove the unsatisfactory roller and to place it in appropriately labeled trays.

In use of my gaging device I have found it very helpful to construct the gage element 11 so that the orifice rim 18 is in the plane of the outer shoulder surface which seats upon the upper surface of the block 7. With such construction it is a relatively simple procedure to set the abutment screw 21, as by using a depth micrometer supported on the upper surface of block 7. Also, in use, it is preferred that valve 12 be adjusted to provide relatively low pressures at the measuring orifice, in order that the operator's fingers may be subjected least wear; if the pressure is too high, fingers may become sore after as few as 200 pieces have been inspected.

In the above discussion, gages 8 and 13 have been referred to as pressure-responsive indicating means, but it will be understood that the fluid used in my device is always flowing and that the indicated pressures may be considered representative of given flow rates. Thus, the term pressure-responsive indicating means has been, except where otherwise stated, used to apply to any suitable pressure or flow measuring instrument.

While I have described my invention in detail for the preferred form shown, it will be understood that modifications may be made within the scope of the invention as defined in the appended claims.

I claim:
1. A gage element for a roller having a rolling section of lesser diameter than the maximum diameter of the roller, said element having a gage bore of diameter greater than said rolling section, whereby when the rolling section is positioned opposite the gage bore an annular orifice will be defined between the gage bore and the rolling section, means for admitting fluid pressure to the bore, said element having a counterbore of diameter substantially equal to the maximum diameter of the roller, the counterbore being axially spaced from the gage bore by an amount sufficient for radial-supporting engagement with the roller at substantially the maximum diameter thereof when the lesser section of the roller is positioned at the gage bore, said element further having an annular recess axially between the gage bore and the counterbore, said element also having an exhaust port in fluid-communication with said recess, and supporting means for the roller.

2. In combination, a gage element removably secured to a block having an internal fluid pressure supply passage for said element, said element having a gage bore in communication with said passage and having a gage rim therein, said element further having an annular exhaust-manifold recess axially adjacent said rim and on the other side of said rim with respect to said passage, supporting means in coaxial alignment with the axis of the bore for supporting an anti-friction element having sections of different diameters, the section to be calibrated being in position opposite the rim of the bore adjacent said recess when the antifriction element is supported by said supporting means.

3. A gage, according to claim 2, in which said supporting means includes axially adjustable means carried by said block and projecting into proximity with said rim for engagement with the inserted end of a roller to be gaged, whereby the roller may be adjustably axially positioned with respect to said rim.

4. In a gage of the character indicated, a gage element having an orifice for gaging a roller having a section to be gaged, said orifice having a bore of diameter exceeding the diameter of the roller section to be gaged, whereby an annular orifice may be defined between the bore and the roller section, means for supplying fluid under pressure to one axial side of the gage-orifice, radial-positioning means fixedly carried with said gage element and on the other axial side of the gage-orifice to locate the roller at a section longitudinally spaced from the section to be gaged, said positioning means being coaxial with said bore, and axial-supporting means for the roller on said one axial side of said gage-orifice.

5. In a gage for an antifriction roller having a rolling surface at a section of diameter less than the maximum section diameter of said roller, a gage element having a gage bore of diameter in excess of said lesser diameter, and also having a counterbore on one axial side of the gage bore and coaxial with the gage bore and of a diameter substantially equal to the maximum diameter of the roller, the counterbore being axially spaced from the gage bore by an amount sufficient for radial-supporting engagement with the roller at substantially the maximum diameter thereof when the lesser section of the roller is positioned at the gage bore, roller-supporting means on the other axial side of said gage bore, and means for admitting fluid pressure to the bore.

6. In a gage of the character indicated, a gage element having a gage bore into which a roller to be measured is to be substantially coaxially inserted, such roller having sections of different diameters, axially supporting abutment means at one axial end of the bore and axially facing the gage bore so as to be positioned to intercept one axial end of the roller and thus to axially locate a particular roller section opposite the bore, the bore being of larger diameter than that of the section to be measured, whereby an annular orifice is defined between the roller and the gage bore, and means for delivering air under pressure to the bore over substantially the cross-sectional area of the bore and from said axial end of the bore, whereby the roller may be inserted through the bore and manually held against said abutment means during a gaging operation, and whereby, upon release of the manual hold, the roller may be automatically ejected from said gage.

7. In a gage for an antifriction element having a section to be gaged, a gage member having a bore with one open end to receive the antifriction element upon longitudinal insertion thereof, fluid-communicating means for supplying pressure fluid to the other end of the bore, an inwardly projecting constricting rim in the bore between said ends, and support means for the inserted antifriction element and located beneath said rim, whereby the antifriction element may partially pass within said rim for limiting abutment with said support means so that the section to be gaged may cooperate with said rim to define the constriction determining the flow of pressure fluid through said gage.

HORACE BISHOP VAN DORN.

REFERENCES CITED

The following references are of record in the file of this patent:

UNITED STATES PATENTS

| Number | Name | Date |
|---|---|---|
| 1,901,966 | Hoffman et al. | Mar. 21, 1933 |
| 1,971,271 | Mennesson | Aug. 21, 1934 |
| 1,982,528 | Mennesson | Nov. 27, 1934 |
| 2,360,705 | Moore | Oct. 17, 1944 |
| 2,370,219 | Aller | Feb. 27, 1945 |
| 2,403,897 | Aller | July 16, 1946 |
| 2,431,087 | Subber | Nov. 18, 1947 |
| 2,477,399 | Aller | July 26, 1949 |
| 2,490,376 | Rupley | Dec. 6, 1949 |